(12) United States Patent
Moon et al.

(10) Patent No.: US 8,751,041 B2
(45) Date of Patent: Jun. 10, 2014

(54) METHOD TO GENERATE HUMANLIKE MOTION OF HUMANOID ROBOT

(75) Inventors: Kyung Won Moon, Seongnam-si (KR); Jong Do Choi, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 354 days.

(21) Appl. No.: 13/326,508

(22) Filed: Dec. 15, 2011

(65) Prior Publication Data
US 2012/0158174 A1    Jun. 21, 2012

(30) Foreign Application Priority Data
Dec. 21, 2010    (KR) .......................... 10-2010-0132013

(51) Int. Cl.
*G06F 19/00*    (2011.01)

(52) U.S. Cl.
USPC ............. 700/245; 434/265; 434/275; 600/38; 600/587; 600/595; 600/529; 600/534; 446/295

(58) Field of Classification Search
USPC ............ 434/265, 275; 600/38, 529, 534, 587, 600/595; 446/295; 700/245
See application file for complete search history.

*Primary Examiner* — Bhavesh V Amin
(74) *Attorney, Agent, or Firm* — Staas & Halsey LLP (57) ABSTRACT

A method and apparatus to generate a humanlike motion of a humanoid robot which is capable of performing a humanlike breathing motion. For example, the method includes calculating target rotational angles of respective rotary joints to perform a basic motion according to a user command, calculating rotational angles of respective rotary joints to perform a breathing motion, and generating the breathing motion by adding up the target rotational angles of the respective rotary joints to perform the basic motion and the rotational angles to perform the breathing motion and providing the angles obtained thereby to respective rotary joints constituting joint units related to the breathing motion, thus providing intimacy and aesthetic stability to users.

10 Claims, 5 Drawing Sheets

METHOD TO GENERATE HUMANLIKE MOTION OF HUMANOID ROBOT

CROSS-REFERENCE TO RELATED APPLICATIONS

This application claims the benefit of Korean Patent Application No. 2010-0132013, filed on Dec. 21, 2010 in the Korean Intellectual Property Office, the disclosure of which is incorporated herein by reference.

BACKGROUND

1. Field

Embodiments relate to a method to generate a humanlike motion of a humanoid robot which performs humanlike motions.

2. Description of the Related Art

Recently, practical robots which support living as human partners, i.e., support human vitality from various aspects during daily life other than the residential environment have been developed. Such practical robots have a humanlike appearance and perform movement similar to humans in living conditions the same as those of humans differing from industrial robots, and are thus referred to as humanoid robots.

A humanoid robot having a similar appearance to humans needs to actually perform motions similar to humans so as to provide naturalness, intimacy and convenience to users.

Therefore, research into achievement of humanlike motions of humanoid robots is underway.

SUMMARY

Therefore, it is an aspect of an embodiment to provide a method to generate a humanlike motion of a humanoid robot which is capable of performing a humanlike breathing motion.

Additional aspects of embodiments will be set forth in part in the description which follows and, in part, will be obvious from the description, or may be learned by practice of the embodiments.

In accordance with an aspect of an embodiment, a method to generate a humanlike motion of a humanoid robot includes calculating target rotational angles of respective rotary joints to perform a basic motion according to a user command, calculating rotational angles of respective rotary joints to perform a breathing motion, and generating the breathing motion by adding up the target rotational angles of the respective rotary joints to perform the basic motion and the rotational angles to perform the breathing motion and providing the angles obtained thereby to respective rotary joints constituting joint units related to the breathing motion.

The calculation of the rotational angles of the respective rotary joints to perform the breathing motion may be carried out when the humanoid robot is in a stopped state or performs a gesture unrelated to work.

The calculation of the target rotational angles of the respective rotary joints to perform the basic motion may be carried out by adding compensated angles, calculated using detection data received from the outside, to the reference rotational angles of the respective rotary joints to perform the basic motion.

The detection data received from the outside may be image data of a space about which the humanoid robot moves, captured by cameras.

The calculation of the rotational angles of the respective rotary joints to perform the breathing motion may include calculating a physical strength level of the humanoid robot, calculating a frequency of the breathing motion using the calculated physical strength level, and calculating the rotational angles of the respective rotary joints to perform the breathing motion using the calculated frequency of the breathing motion.

The calculation of the physical strength level of the humanoid robot may be carried out using physical strength level data in the previous control cycle calculated in the previous control cycle of the basic motion, physical strength recovery amount data and energy consumption amount data of the humanoid robot.

The energy consumption amount data of the humanoid robot may be calculated as the sum total of current values detected from the respective rotary joints.

The joint units related to the breathing motion may include shoulder joint units, elbow joint units and a neck joint unit of the humanoid robot.

BRIEF DESCRIPTION OF THE DRAWINGS

These and/or other aspects of embodiments will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout.

Figure 1:
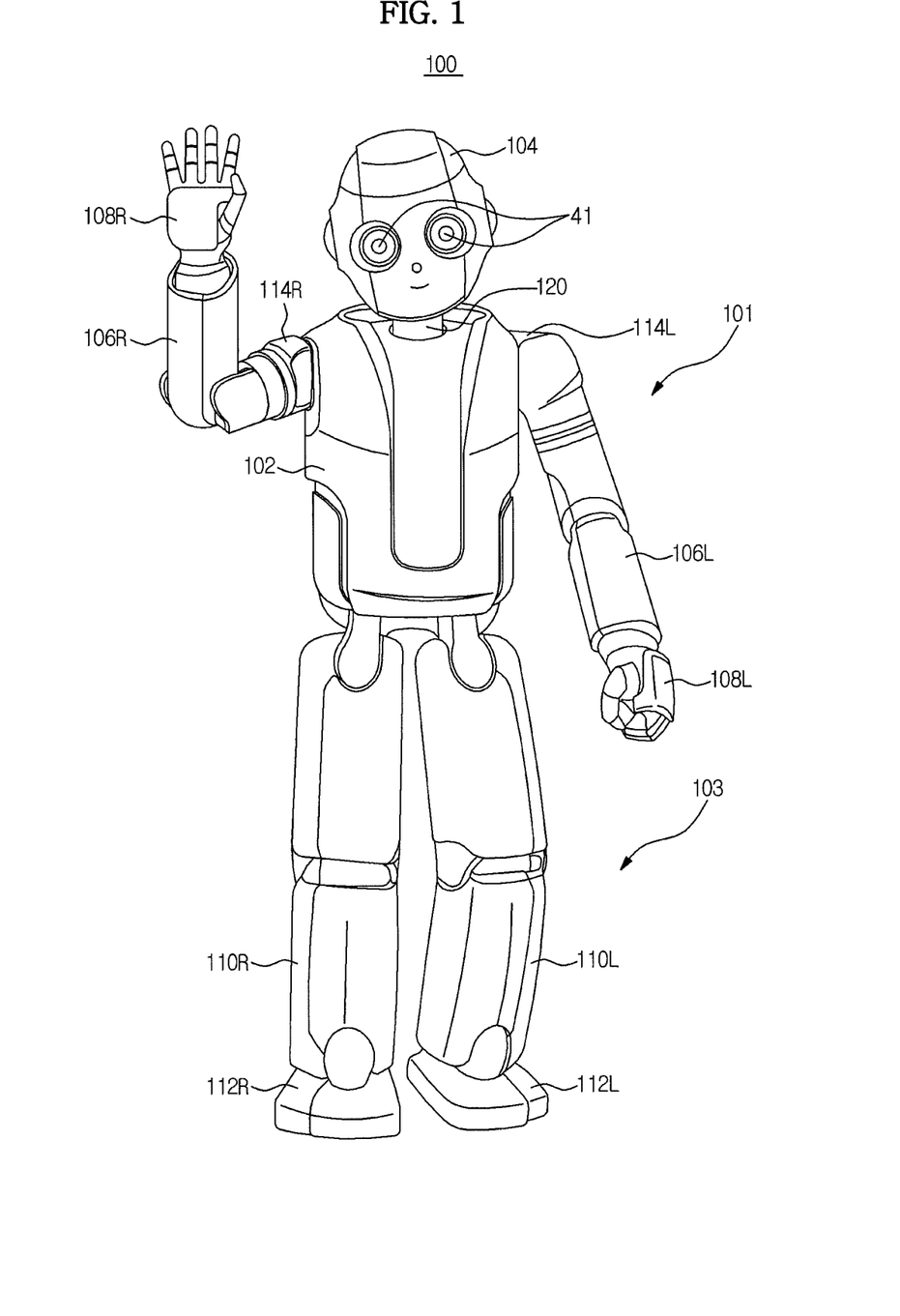
FIG. 1 is a view illustrating an external appearance of a humanoid robot in accordance with an embodiment.

FIG. 1 is a view illustrating an external appearance of a humanoid robot in accordance with an embodiment.

As shown in FIG. 1, a humanoid robot 100 in accordance with an embodiment is a bipedal robot which walks upright with two legs 110L and 110R in the same manner as a human, and includes an upper body 101 including a torso 102, a head 104 and arms 106L and 106R and a lower body 103 including the two legs 110L and 110R.

The upper body 101 of the humanoid robot 100 includes the torso 102, the head 104 connected to the upper part of the torso 102 through a neck 120, the two arms 106L and 106R connected to both sides of the upper part of the torso 102 through shoulders 114L and 114R, and hands 108L and 108R respectively connected to the tips of the two arms 106L and 106R. Cameras 41 to capture images of a space about which the robot 100 moves are mounted in elements having the shape of a human eye on the head 104.

The lower body 103 of the humanoid robot 100 includes the two legs 110L and 110R connected to both sides of the lower part of the torso 102 of the upper body 101, and feet 112L and 112R respectively connected to the tips of the two legs 110L and 110R.

Here, "L" and "R" respectively indicate the left and right sides of the humanoid robot 100.

Figure 2:
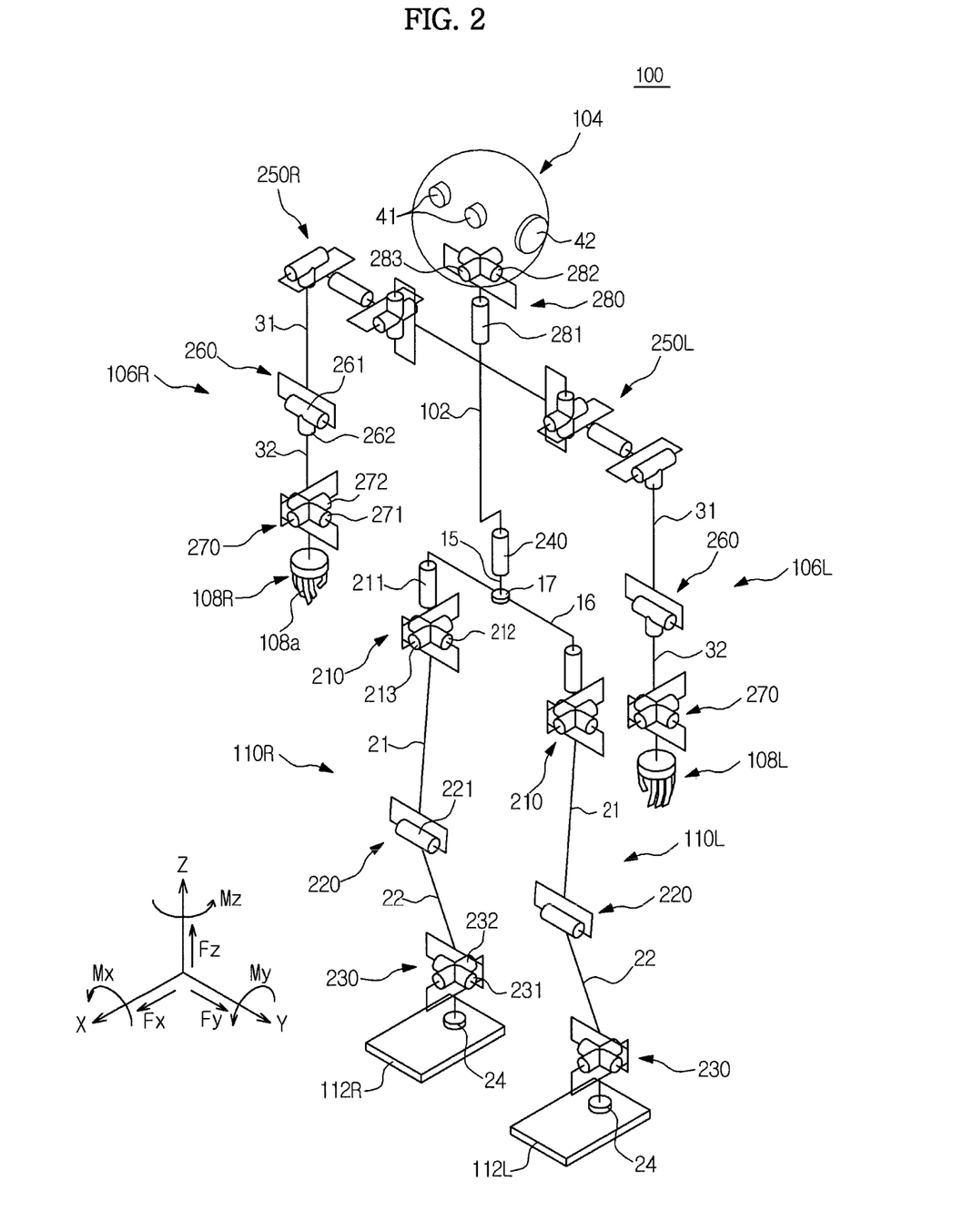
FIG. 2 is a view illustrating a main element and joint structure of the humanoid robot in accordance with an embodiment.

FIG. 2 is a view illustrating a main element and joint structure of the humanoid robot in accordance with an embodiment.

As shown in FIG. 2, in addition to the cameras 41 to capture images of the space about which the humanoid robot 100 moves, microphones 42 for user voice input are installed on the head 104 of the humanoid robot 100.

The head 104 is connected to the torso 102 of the upper body 101 through a neck joint unit 280. The neck joint unit 280 includes a rotary joint 281 in the yaw direction (rotated around the Z-axis), a rotary joint 282 in the pitch direction (rotated around the Y-axis) and a rotary joint 283 in the roll direction (rotated around the X-axis), and thus has 3 degrees of freedom.

Motors to rotate the head 104 (for example, actuators such as electric motors or hydraulic motors) are connected to the respective rotary joints 281, 282 and 283 of the neck joint unit 280.

The two arms 106L and 106R of the humanoid robot 100 respectively include upper arm links 31, lower arm links 32 and the hands 108L and 108R.

The upper arm links 31 are connected to the upper body 101 through shoulder joint units 250L and 250R, the lower arm links 32 are connected to the upper arm links 31 through elbow joint units 260, and the hands 108L and 108R are connected to the lower arm links 32 through wrist joint units 270.

The shoulder joint units 250L and 250R are installed at both sides of the torso 102 of the upper body 101 and connect the two arms 106L and 106R to the torso 102 of the upper body 101.

Each of the elbow joint units 260 includes a rotary joint 261 in the pitch direction and a rotary joint 262 in the yaw direction, and thus has 2 degrees of freedom.

Each of the wrist joint units 270 includes a rotary joint 271 in the pitch direction and a rotary joint 272 in the roll direction, and thus has 2 degrees of freedom.

Five fingers 108a are installed on each of the hands 108L and 108R. Each of the fingers 108a may be provided with a plurality of joints (not shown) driven by motors. The fingers 108a perform various motions, such as gripping an object and indicating a specific direction, in connection with movement of the arms 106L and 106R.

A waist joint unit 240 having 1 degree of freedom in the yaw direction (rotated around Z-axis) to rotate the upper body 101 is installed on the torso 102.

A pelvis 15 to support the upper body 101 is connected to the waist joint unit 240 installed at the lower part of the upper body 101. The pelvis 15 is connected to a hip joint unit 210 through a pelvis link 16. An inertial sensor 17, such as an inertial measurement unit (IMU), to detect pose data (angle data) of the humanoid robot 10 is installed on the pelvis link 16. The inertial sensor 17 detects relative angles of the pelvis link 16 with respect to the gravity direction and an inertial system, and generates pose data (angle data) in the roll, pitch and yaw directions. The inertial sensor 17 may be installed on the torso 102 and the head 104 as well as on the pelvis link 16.

The two legs 110L and 100R of the robot 100 respectively include thigh links 21, calf links 22 and the feet 112L and 112R.

The thigh links 21 correspond to thighs of a human and are connected to the torso 102 of the upper body 101 through hip joint units 210, the calf links 22 are connected to the thigh links 21 through knee joint units 220, and the feet 112L and 112R are connected to the calf links 22 through ankle joint units 230.

Each of the hip joint units 210 includes a rotary joint (i.e., a hip yaw joint) 211 in the yaw direction (rotated around the Z-axis), a rotary joint (i.e., a hip pitch joint) 212 in the pitch direction (rotated around the Y-axis) and a rotary joint (i.e., a hip roll joint) 213 in the roll direction (rotated around the X-axis), and thus has 3 degrees of freedom.

Each of the knee joint units 220 includes a rotary joint 221 in the pitch direction and thus has 1 degree of freedom.

Each of the ankle joint units 230 includes a rotary joint 231 in the pitch direction and a rotary joint 232 in the roll direction, and thus has 2 degrees of freedom.

Since six rotary joints are provided on the hip joint unit 210, the knee joint unit 220 and the ankle joint unit 230 of each of the two legs 110L and 110R, a total of twelve rotary joints is provided on the two legs 110L and 110R.

Multi-axis force/torque sensors 24 are respectively installed between the feet 112L and 112R and the ankle joint units 230 of the two legs 110L and 110R. The multi-axis force/torque sensors 24 measure three directional component $Mx$, $My$ and $Mz$ of moment and three directional components $Fx$, $Fy$ and $Fz$ of force transmitted from the feet 112L and 112R, thus detecting whether or not the feet 112L and 112R contact the ground and load applied to the feet 112L and 112R.

Figure 3:
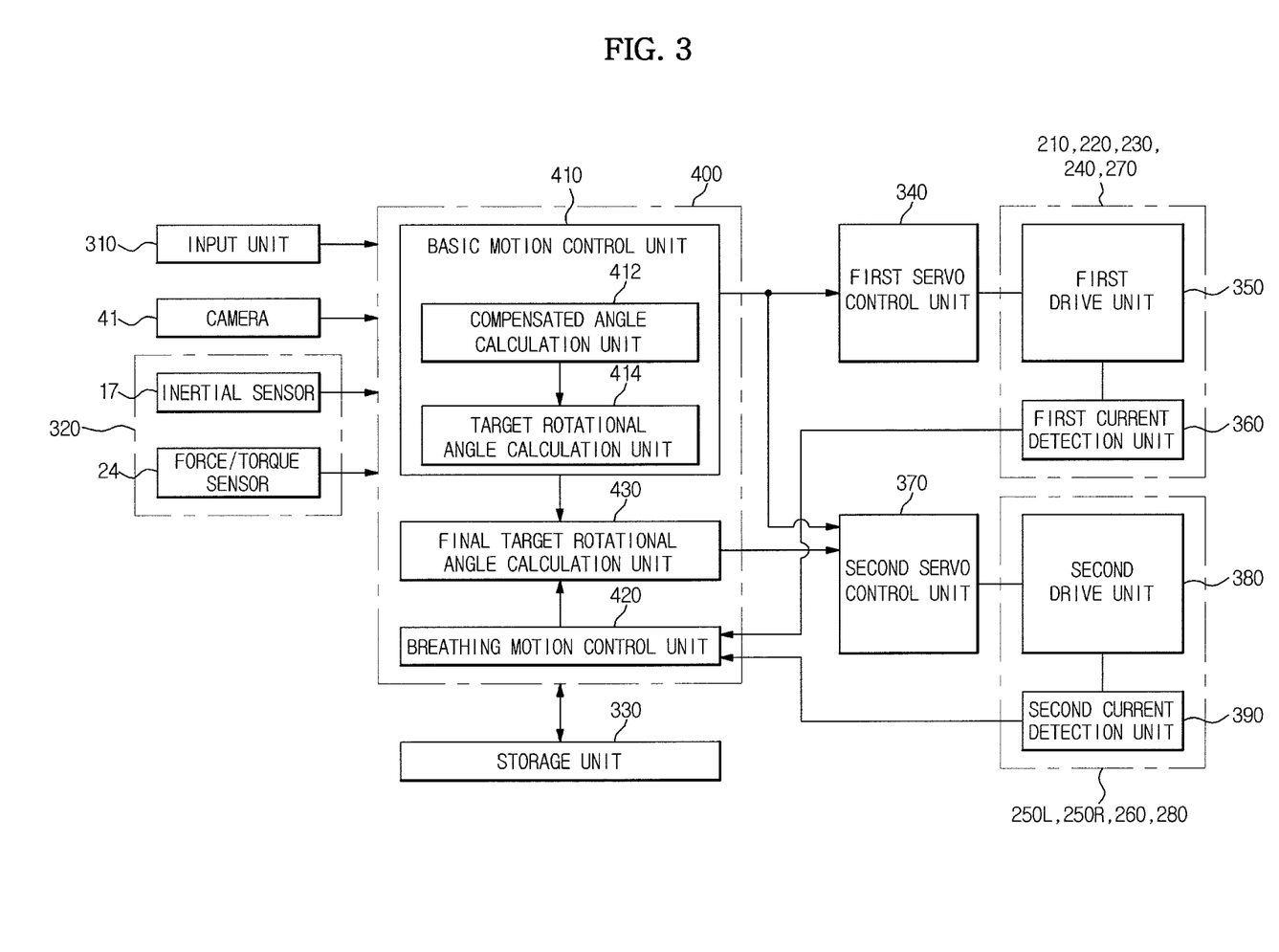
FIG. 3 is a control block diagram of the humanoid robot in accordance with an embodiment.

Although not shown in FIG. 2, actuators (corresponding to "first and second drive units" of FIG. 3), such as motors to drive the respective rotary joints using power (electric or hydraulic power), and current transformer sensors (corresponding to "first and second current detection units" of FIG. 3) to detect current values flowing in the respective actuators are installed at the respective joint units of the humanoid robot 100.

FIG. 3 is a control block diagram of the humanoid robot in accordance with an embodiment.

As shown in FIG. 3, the humanoid robot 100 in accordance with an embodiment includes an input unit 310, the cameras 41, a pose detection unit 320, a controller 400, a storage unit 330, a first servo control unit 340, the first drive unit 350, the first current detection unit 360, a second servo control unit 370, the second drive unit 380 and the second current detection unit 390.

The input unit 310 serves to allow a user to input a motion command (for example, a humanoid command, a work command, etc.) to the humanoid robot 100, and may include a user interface (UI) or a remote controller.

The cameras 41 detect light reflected by a subject and convert the light into a digital signal, thus capturing images of a space about which the humanoid robot 100 moves. As the cameras 41, stereo cameras or time of flight (TOF) cameras may be used. In addition, any devices which obtain image data of an object located on a path of the humanoid robot 100 may be used as the cameras 41.

The pose detection unit 320 includes the inertial sensor 17 to measure tilts and rotational angles of the pelvis link 16 in the roll, pitch and yaw directions, and the multi-axis force/torque sensors 24 respectively installed between the feet 112L and 112R and the ankle joint units 230 of the humanoid robot 100 to detect whether or not the feet 112L and 112R contact the ground.

Here, the inertial sensor 17 serves to measure various data related to navigation, such as velocity, acceleration and direction (angle) of the humanoid robot 100, and includes a tilt sensor to measure an angle and an angular velocity sensor to measure an angular velocity. An accelerometer is used as the tilt sensor and a rate gyroscope is used as the angular velocity sensor.

The controller 400 serves to control overall motion of the humanoid robot 100, and includes a basic motion control unit 410, a breathing motion control unit 420 and a final target rotational angle calculation unit 430.

The basic motion control unit 410 serves to calculate rotational angles which need to be output to the respective rotary joints so as to perform a motion in response to a user command (hereinafter, referred to as a "basic motion"), and includes a compensated angle calculation unit 412 and a target rotational angle calculation unit 141.

The compensated angle calculation unit 412 calculates angles necessary to compensate for reference rotational angles of the respective rotary joints to perform the basic motion using detection data received from the cameras 41 or the inertial sensor 17.

The target rotational angle calculation unit 141 calculates target rotational angles of the basic motion by adding the compensated angles calculated by the compensated angle calculation unit 412 to the reference rotational angles of the respective rotary joints read from the storage unit 330 related to the basic motion.

Of course, if the detection data received from the cameras 41 or the inertial sensor 17 are not available, the reference rotational angles of the respective rotary joints related to the basic motion, stored in advance in the storage unit 330, serve as target rotational angles for the basic motion.

The breathing motion control unit 420 serves to calculate rotational angles which need to be output to the respective rotary joints forming the joint units related to a breathing motion so as to perform the breathing motion, and calculates the rotational angles for the breathing motion using current detection data calculated by the first and second current detection units 360 and 390 and various data stored in advance in the storage unit 330. A detailed configuration and operation of the breathing motion control unit 420 (a method of calculating rotational angles for the breathing motion) will be described later with reference to FIG. 4.

The final target rotational angle calculation unit 430 calculates final target rotational angles by adding up the target rotational angles for the basic motion calculated by the basic motion control unit 410 and the rotational angles for the breathing motion calculated by the breathing motion control unit 420, and outputs the calculated final target rotational angles to the second servo control unit 370 controlling the second drive unit 380 to drive the respective rotary joints of the shoulder joint units 250L and 250R, the elbow joint units 260 and the neck joint unit 280, which are related to the breathing motion, i.e., are used when the breathing motion is performed.

The storage unit 330 is a memory to store in advance data necessary to perform basic motions of the humanoid robot 100 and to store in advance data necessary to perform the breathing motion of the humanoid robot 100. That is, the storage unit 330 stores reference rotational angles of the respective rotary joints for the basic motions (for example, walking, object grasping and gestures, etc.) of the humanoid robot 100, a magnitude scaling factor (hereinafter, referred to as "MSF") to scale the magnitude of the breathing motion, and various data calculated during calculation of the rotational angles for the breathing motion.

Although an embodiment illustrates the storage unit 330 as being separately provided so as to store in advance data necessary to perform the basic motions and breathing motion of the humanoid robot 100, the storage unit 330 may be omitted and a memory provided in the controller 400 to store in advance data necessary to perform the basic motions and breathing motion may be employed.

The first servo control unit 340 generates joint torques τ to track the target rotational angle data transmitted from the basic motion control unit 410 and outputs torque control signals corresponding to the generated joint torques τ to the first drive unit 350 to drive the respective rotary joints of the hip joint units 210, the knee joint units 220, the ankle joint units 230, the waist joint unit 240 and the wrist joint units 270 which is closely unrelated to the breathing motion.

The first drive unit 350 includes actuators, such as motors to transmit electric or hydraulic power to the respective rotary joints of the joint units, and drives the respective rotary joints of the hip joint units 210, the knee joint units 220, the ankle joint units 230, the waist joint unit 240 and the wrist joint units 270 in response to the torque control signals transmitted form the first servo control unit 340.

The first current detection unit 360 serves to detect current values flowing in the actuators (the drive unit) installed to drive the respective rotary joints provided in the hip joint units 210, the knee joint units 220, the ankle joint units 230, the waist joint unit 240 and the wrist joint units 270, and may include current transformer (CT) sensors.

The second servo control unit 370 generates joint torques τ to track the target rotational angle data transmitted from the final target rotational angle calculation unit 430 and outputs torque control signals corresponding to the generated joint torques τ to the second drive unit 380 to drive the respective rotary joints of the shoulder joint units 250L and 250R, the elbow joint units 260 and the neck joint unit 280. Further, the second servo control unit 370 generates joint torques τ to track the final target rotational angle data transmitted from the final target rotational angle calculation unit 430 and outputs torque control signals corresponding to the generated joint torques to the second drive unit 380 to drive the respective rotary joints of the shoulder joint units 250L and 250R, the elbow joint units 260 and the neck joint unit 280, which are related to the breathing motion.

The second drive unit 380 includes actuators, such as motors to transmit electric or hydraulic power to the respective rotary joints of the joint units, and drives the respective rotary joints of the shoulder joint units 250L and 250R, the elbow joint units 260 and the neck joint unit 280 in response to the torque control signals transmitted form the second servo control unit 370.

The second current detection unit 390 serve to detect current values flowing in the actuators (the drive unit) installed to drive the respective rotary joints provided in the shoulder joint units 250L and 250R, the elbow joint units 260 and the neck joint unit 280, and may include current transformer (CT) sensors.

In an embodiment, the final target rotational angle data (related to a motion in which the breathing motion is additionally applied to the basic motion) calculated by the final target rotational angle calculation unit 430 are not provided to all the respective joints and are output only to the second servo control unit 370 controlling the second drive unit 380 to drive the respective joints of the shoulder joint units 250L and 250R, the elbow joint units 260 and the neck joint unit 280, which are related to the breathing motion. Although an embodiment exemplarily illustrates that the joint units related to the breathing motion set to the shoulder joint units 250L and 250R, the elbow joint units 260 and the neck joint unit 28, the joint units related to the breathing motion may be variously set, for example, be set to only the shoulder joint units 250L and 250R, which are most closely related to the breathing motion (which most greatly moves through the breathing motion).

In an embodiment, the rotational angles of the respective rotary joints calculated to perform the breathing motion of the humanoid robot 100 are added to the target rotational angles of the respective rotary joints calculated to perform the basic motion of the humanoid robot 100, and a motion of the humanoid 100 (a motion in which the breathing motion is additionally applied to the basic motion) is controlled using the final target rotational angles obtained thereby. Here, if the humanoid robot 100 is controlled based on the above-described motion control algorithm, the final target rotational angles output to the second servo control unit 270 controlling the actuators (the second drive unit 280) to drive the respective joints of the joint units 250L, 250R, 260 and 280 related to the breathing motion are expressed by Equation 1 below.

Final Target Rotational Angle=Target Rotational Angle for Basic Motion+Rotational Angle for Breathing Motion  [Equation 1]

Here, the target rotational angles for the basic motion are rotational angles of the respective joints to control the basic motion of the humanoid robot 100, and the basic motion control unit 410 calculates the target rotational angles for the basic motion by adding the compensated angles calculated using the detection data received from the cameras 41 and the inertial sensor 17 to the reference rotational angles of the respective joints for the basic motion (for example, walking, object grasping or a gesture) stored in advance in the storage unit 330. Of course, if the detection data received from the cameras 41 or the inertial sensor 17 are not available, the reference rotational angles of the respective rotary joints related to the basic motion, stored in advance in the storage unit 330, serve as the target rotational angles for the basic motion.

Hereinafter, a method of calculating the rotational angles for the breathing motion will be described in detail with reference to FIG. 4.

Figure 4:
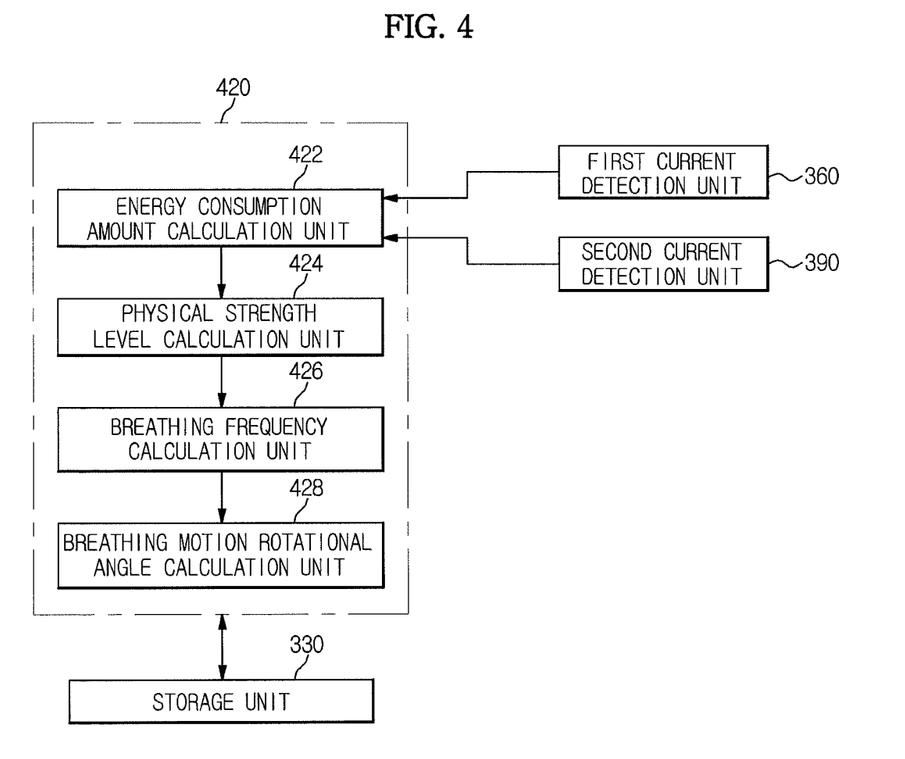
FIG. 4 is a detailed block diagram of a breathing motion control unit shown in FIG. 3.

FIG. 4 is a detailed block diagram of the breathing motion control unit shown in FIG. 3.

As shown in FIG. 4, the breathing motion control unit 420 includes an energy consumption amount calculation unit 422, a physical strength level calculation unit 424, a breathing frequency calculation unit 426 and a breathing motion rotational angle calculation unit 428.

The breathing motion rotational angle calculation unit 428 serves to calculate rotational angles for the breathing motion added to the target rotational angles for the basic motion to form the final target rotational angles, and the rotational angles for the breathing motion are calculated using Equation 2 below.

Rotational Angle for Breathing Motion=Rotating Direction×MSF×{(1−cos(2×π×BF×T)}  [Equation 2]

Here, the rotating direction is a rotating direction of each of the rotary joints to perform the breathing motion of the humanoid robot 100, has a value of 1 or −1 and is determined by components (a gear ratio, etc.) of system hardware of each of the rotary joints. Further, MSF represents a magnitude scaling factor, BF represents a breathing frequency, i.e., a frequency of the breathing motion, and T represents a control cycle of the motion of the humanoid robot 100.

The MSF is a value to determine the magnitude of the breathing motion, and may be set within the range of 0 to 1 according to characteristics of a basic motion which the humanoid robot 100 desires to perform. For example, if the humanoid robot 100 stands in place (i.e., in a standby pose or in a stopped state), the MSF is set to the largest value, i.e., 1, and if a basic motion not requiring high operating accuracy of the joint units (rotary joints), such as a gesture (for example, hand waving or greeting), is performed and thus the breathing motion may be additionally applied to the basic motion, the MSF is set to a value between 0 and 1 and thus the breathing motion of the humanoid robot 100 may be performed. However, if a basic motion (for example, a basic motion mainly using arms and hands, such as object grasping) is performed, the MSF is set to 0 so as not to perform the breathing motion and thus work is not hindered. The MSF is set in advance according to characteristics of the basic motion and is stored in the separate storage unit 330 or the memory provided within the controller 400.

The BF of the breathing motion is a value representing a tempo (breathless degree) of the breathing motion, and is gradually increased if a rapid humanoid motion or a running motion is performed. That is, in order to perform the breathing motion similar to humans, if a rapid motion of the humanoid robot 100 is continuously performed, the BF is increased so that the humanoid robot 100 rapidly performs the breathing motion. The breathing frequency calculation unit 426 calculates the BF of the breathing motion using Equation 3 below, and outputs the calculated BF of the breathing motion to the breathing motion rotational angle calculation unit 428.

$$BF = \frac{K1}{PhysicalStrengthLevel(PSL)}$$  [Equation 3]

Here, K1 is a constant set to optimize relations between BF and PSL (to coincide units thereof with each other).

PSL is a value obtained by digitizing a current vitality degree of the humanoid robot 100, and serves to determine the tempo of the breathing motion. As seen from Equation 3, the smaller the physical strength level is, the higher the tempo of the breathing motion performed by the humanoid robot 10. For example, if the humanoid robot 100 performs a rapid humanoid motion or a running motion, the physical strength level is gradually decreased and the frequency of the breathing motion is increased due to the decreased physical strength level, and thus the humanoid robot 100 rapidly performs the breathing motion. The physical strength level calculation unit 424 calculates the physical strength level using Equations 4 and 5, and outputs the calculated physical strength level to the breathing frequency calculation unit 426.

PSL=Physical Strength Level in Previous Stage−Energy Consumption Amount  [Equation 4]

PSL=Physical Strength Level in Previous Stage+Physical Strength Recovery Amount  [Equation 5]

If the humanoid robot 100 performs a basic motion, the physical strength level is calculated using Equation 4, and if the humanoid robot 100 maintains the stopped state, the physical strength level is calculated using Equation 5.

The physical strength level is calculated per control cycle. When the basic motion of the humanoid robot 100 is continued, the physical strength level is gradually decreased due to the energy consumption amount (using Equation 4), and when the humanoid robot 100 maintains the stopped state (standby pose) without any motion, the physical strength level is gradually increased due to the physical strength recovery amount (using Equation 5). However, since the physical strength level is not increased indefinitely, the physical strength level is defined as being saturated when it reaches a designated value and designed so as to have a set value (for example, in the range of 0~100).

Here, the physical strength level in the previous stage is a physical strength level calculated in the previous control cycle. The largest physical strength level is stored at the initial stage of the motion of the humanoid robot 100, and then when the motion of the humanoid robot 100 is started, the energy consumption amount is increased and the physical strength level is decreased, and when the humanoid robot 100 is stopped, the energy consumption amount becomes 0 and the physical strength level is increased.

The physical strength recovery amount is a constant of a positive value to increase the physical strength level of the humanoid robot 100, and is set to a proper value selected through relations with the physical strength level (for example, if the physical strength level is designed to have a value in the range of 0~100, the physical strength recovery amount is set to have a value of 5). That is, the physical strength recovery amount actually means a value converted so as to correspond to the physical strength level.

The energy consumption amount means the total energy amount consumed by the humanoid robot 100 in the current control cycle. The total energy amount consumed by the humanoid robot 100 may be calculated from the sum total of current values measured by the actuators, such as the motors mounted at the respective rotary joints of the humanoid robot 100. Since the current values measured by the respective rotary joints of the humanoid robot 100 may be both positive and negative values according to a moving direction of the humanoid robot 100, the energy consumption amount is calculated using the absolute values of the measured current values. The energy consumption amount calculation unit 422 calculates the energy consumption amount by adding up all the current values detected by the first current detection unit 360 and the second current detection unit 390, as shown in Equation 6 below, and outputs the calculated energy consumption amount to the physical strength level calculation unit 424.

$$EnergyConsumptionAmount = K2 \times \sum_{n=1}^{numofrobotjoints} absolute(n - thjointcurrent)$$ [Equation 6]

Here, K2 is a constant set to optimize relations between the energy consumption amount and the physical strength level (to coincide units thereof with each other). The energy consumption amount actually means a value converted so as to correspond to the physical strength level.

Although Equation 6 exemplarily shows the energy consumption amount as being calculated from the sum total of the current values measured by the actuators, such as the motors mounted at the respective rotary joints, the energy consumption amount may be calculated from the sum total of torque values measured by the actuators, such as the motors mounted at the respective rotary joints.

Figure 5:
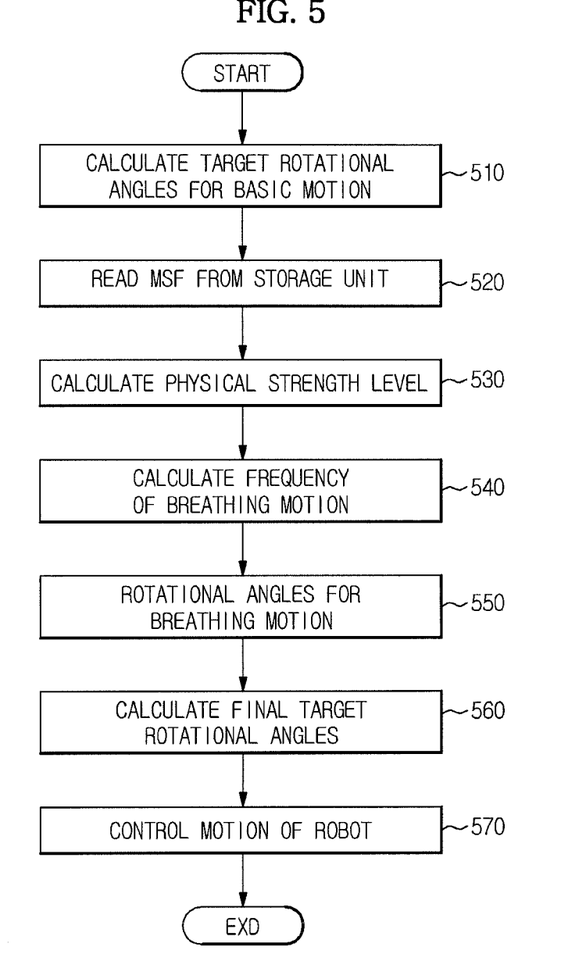
FIG. 5 is a flow chart illustrating a method to generate a humanlike motion of a humanoid robot in accordance with an embodiment.

Hereinafter, a method to generate a humanlike motion of a humanoid robot in accordance with an embodiment will be described with reference to FIG. 5.

As the initial condition to describe the motion of the humanoid robot 100 in accordance with this embodiment, it is assumed that the reference rotational angles of the respective rotary joints for respective basic motions (for example, walking, object grasping and gestures) of the humanoid robot 100 and the MSF to adjust the magnitude of the breathing motion are stored in advance in the storage unit 330.

When the humanoid robot 100 receives a motion command from a user through the input unit 310, the humanoid robot 100 starts to perform a basic motion.

When the humanoid robot 100 receives the motion command through the input unit 310, the basic motion control unit 410 of the controller 400 calculates target rotational angles for the basic motion by adding compensated angles, calculated using the detection data received from the cameras 41 and the inertial sensor 17, to the reference rotational angles of the respective joints related to the received motion command (the basic motion) from the storage unit 300 (Operation 510). The basic motion control unit 410 outputs the calculated target rotational angles for the basic motion to the first servo control unit 340.

Thereafter, the breathing motion control unit 420 of the controller 400 reads the MSF data related to the received motion command from the storage unit 330 (Operation 520).

When the MSF read from the storage unit 330 is 0, the breathing motion control unit 420 judges that the basic motion performed by the humanoid robot 100 is a motion requiring high operating accuracy, such as object grasping, and does not perform a subsequent process to calculate rotational angles for the breathing motion.

On the other hand, when the MSF read from the storage unit 330 is not 0, the breathing motion control unit 420 judges that the basic motion performed by the humanoid robot 100 does not require high operating accuracy and thus the breathing motion may be additionally applied to the basic motion, and continuously performs the subsequent process to calculate rotational angles for the breathing motion.

Thereafter, the breathing motion control unit 420 calculates a physical strength level in the current control cycle using an energy consumption amount, calculated through a physical strength level calculated in the previous control cycle, a physical strength recovery amount and current detection data of the first and second current detection units 360 and 390 (Operation 530).

Next, the breathing motion control unit 420 calculates a frequency of the breathing motion (a tempo of the breathing motion) to be performed using the calculated physical strength level (Operation 540).

Thereafter, the breathing motion control unit 420 calculates rotational angles for the breathing motion using rotating direction data of rotary joints to perform the breathing motion, the MSF read from the storage unit 330 and the frequency of the breathing motion calculated in Operation 540 (Operation 550).

Next, the final target rotational angle calculation unit 430 of the controller 400 calculates final target rotational angles by adding up the target rotational angles for the basic motion calculated by the basic motion control unit 410 and the rotational angles for the breathing motion calculated by the breathing motion control unit 420 (Operation 560).

Thereafter, the final target rotational angle calculation unit 430 controls a motion of the humanoid robot 100 by outputting the calculated final target rotational angles to the second servo control unit 370 controlling the second drive unit 380 to drive the respective rotary joints of the joint units 250L, 250R, 260 and 280, which are related to the breathing motion (Operation 570). Here, the motion of the humanoid robot 100 is a motion in which the breathing motion is additionally applied to the basic motion.

As is apparent from the above description, a method to generate a humanlike motion of a humanoid robot in accordance with an embodiment enables a humanoid robot to perform a humanlike breathing motion, thereby providing intimacy and aesthetic stability to users.

Further, the method in accordance with an embodiment controls the breathing motion of the humanoid robot according to characteristics of a basic motion, thereby performing the breathing motion without lowering operating accuracy of the humanoid robot.

The embodiments can be implemented in computing hardware and/or software, such as (in a non-limiting example) any computer that can store, retrieve, process and/or output data and/or communicate with other computers. For example, the controller 400 in FIG. 3 may include a computer to perform operations and/or calculations described herein. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method comprising:
    calculating, by a computer, target rotational angles of respective rotary joints of a humanoid robot to perform a basic motion by the humanoid robot according to a user command;
    calculating, by a computer, rotational angles of respective rotary joints of the humanoid robot to perform a breathing motion by the humanoid robot; and
    generating the breathing motion by adding up, by a computer, the calculated target rotational angles of the respective rotary joints of the humanoid robot to perform the basic motion and the calculated rotational angles of the respective rotary joints of the humanoid robot to perform the breathing motion to thereby obtain added angles, and providing the added angles to respective rotary joints of the humanoid robot constituting joint units related to performing the breathing motion.

2. The method according to claim 1, wherein the calculation of the rotational angles of the respective rotary joints of the humanoid robot to perform the breathing motion by the humanoid robot is carried out when the humanoid robot is in a stopped state or performs a gesture unrelated to work.

3. The method according to claim 1, wherein the calculation of the target rotational angles of the respective rotary joints of the humanoid robot to perform the basic motion by the humanoid robot is carried out by adding compensated angles, calculated using detection data received from the outside, to reference rotational angles of the respective rotary joints of the humanoid robot to perform the basic motion by the humanoid robot.

4. The method according to claim 3, wherein the detection data received from the outside are image data of a space about which the humanoid robot moves, captured by cameras.

5. The method according to claim 1, wherein the calculation of the rotational angles of the respective rotary joints of the humanoid robot to perform the breathing motion by the humanoid robot includes:
    calculating a physical strength level of the humanoid robot;
    calculating a frequency of the breathing motion using the calculated physical strength level; and
    calculating the rotational angles of the respective rotary joints of the humanoid robot to perform the breathing motion by the humanoid robot using the calculated frequency of the breathing motion.

6. The method according to claim 5, wherein the calculation of the physical strength level of the humanoid robot is carried out using physical strength level data in a previous control cycle calculated in the previous control cycle of the basic motion, physical strength recovery amount data and energy consumption amount data of the humanoid robot.

7. The method according to claim 6, wherein the energy consumption amount data of the humanoid robot is calculated as the sum total of current values detected from a plurality of rotary joints of the humanoid robot.

8. The method according to claim 7, wherein the plurality of rotary joints of the humanoid robot include rotary joints provided in hip joint units, knee joint units, ankle joint units, a waist joint unit, wrist joint units, shoulder joint units, elbow joint units and a neck joint unit of the humanoid robot.

9. The method according to claim 1, wherein the joint units related to the breathing motion include shoulder joint units, elbow joint units and a neck joint unit of the humanoid robot.

10. A humanoid robot comprising:
    a controller, including a computer, to
        calculate target rotational angles of respective rotary joints of the humanoid robot required to perform a basic motion by the humanoid robot according to a user command,
        calculate rotational angles of respective rotary joints of the humanoid robot required to perform a breathing motion by the humanoid robot,
        to add the calculated target rotational angles of the respective rotary joints of the humanoid robot required to perform the basic motion and the calculated rotational angles of the respective rotary joints of the humanoid robot required to perform the breathing motion to thereby obtain added angles, and
        to control the respective rotary joints of the humanoid robot required to perform the breathing motion in accordance with the added angles, so that the humanoid robot performs the breathing motion.

* * * * *